United States Patent
Cambou et al.

(10) Patent No.: US 11,552,787 B2
(45) Date of Patent: Jan. 10, 2023

(54) KEY EXCHANGE SCHEMES WITH ADDRESSABLE ELEMENTS

(71) Applicants: Arizona Board of Regents on Behalf of Northern Arizona University, Flagstaff, AZ (US); Government of the United States of America, as represented by the Secretary of the Air Force, Rome, NY (US)

(72) Inventors: Bertrand F Cambou, Flagstaff, AZ (US); Christopher Robert Philabaum, Flagstaff, AZ (US); Donald A. Telesca, Jr., Whitesboro, NY (US)

(73) Assignees: ARIZONA BOARD OF REGENTS ON BEHALF OF NORTHERN ARIZONA UNIVERSITY, Flagstaff, AZ (US); GOVERNMENT OF THE UNITED STATES OF AMERICA, AS REPRESENTED BY THE SECRETARY OF THE AIR FORCE, Rome, NY (US)

(*) Notice: Subject to any disclaimer, the term of this patent is extended or adjusted under 35 U.S.C. 154(b) by 0 days.

(21) Appl. No.: 17/579,426

(22) Filed: Jan. 19, 2022

(65) Prior Publication Data
US 2022/0150052 A1 May 12, 2022

Related U.S. Application Data

(62) Division of application No. 16/297,438, filed on Mar. 8, 2019, now Pat. No. 11,265,151.
(Continued)

(51) Int. Cl.
*H04L 9/08* (2006.01)
*H04L 9/32* (2006.01)
*H04L 9/30* (2006.01)

(52) U.S. Cl.
CPC .......... *H04L 9/0819* (2013.01); *H04L 9/30* (2013.01); *H04L 9/3242* (2013.01); *H04L 9/3278* (2013.01)

(58) Field of Classification Search
CPC ..... H04L 9/006; H04L 9/0816; H04L 9/0819; H04L 9/0825; H04L 9/0861; H04L 9/0866; H04L 9/30; H04L 9/3278
See application file for complete search history.

(56) References Cited

U.S. PATENT DOCUMENTS 8,750,502 B2 6/2014 Kirkpatrick et al.
2011/0286599 A1 11/2011 Tuyls et al.
(Continued)

*Primary Examiner* — Eric W Shepperd
(74) *Attorney, Agent, or Firm* — Quarles & Brady LLP

(57) ABSTRACT

A computing device includes an array of addressable elements. Each addressable element is a hardware element that generates a substantially consistent response when interrogated. The device includes a processor coupled to the array of addressable elements and configured to communicate using a communication network. The processor receives a public key, and processes the public key to produce at least a set of addresses. Each address in the set of addresses identifies one or more hardware elements in the array of addressable elements. The processor generates a set of responses by interrogating the one or more hardware elements in the array of addressable elements identified by the set of addresses according to a set of reading instructions, appends the responses in the set of responses to generate a private key, receives an encrypted message and decrypts the encrypted message using the private key to generate an unencrypted message.

6 Claims, 9 Drawing Sheets

Related U.S. Application Data

(60) Provisional application No. 62/640,829, filed on Mar. 9, 2018.

(56) References Cited

U.S. PATENT DOCUMENTS

| | | |
|---|---|---|
| 2012/0183135 A1 | 7/2012 | Paral et al. |
| 2012/0290845 A1* | 11/2012 | Bares .................... H04L 9/3247 713/170 |
| 2014/0093074 A1 | 4/2014 | Gotze et al. |
| 2014/0310515 A1* | 10/2014 | Kim ...................... G06F 21/445 713/168 |
| 2015/0178143 A1* | 6/2015 | Mathew .................... H04L 9/34 714/5.1 |
| 2015/0195088 A1* | 7/2015 | Rostami ................ H04L 9/3278 380/28 |
| 2015/0234751 A1 | 8/2015 | Van Der Sluis et al. |
| 2016/0078252 A1 | 3/2016 | Chandra et al. |
| 2017/0046129 A1 | 2/2017 | Cambou |
| 2017/0048072 A1 | 2/2017 | Cambou |
| 2017/0063559 A1 | 3/2017 | Wallrabenstein |
| 2017/0141929 A1 | 5/2017 | Afghan et al. |
| 2017/0235938 A1 | 8/2017 | Cambou et al. |
| 2018/0039581 A1 | 2/2018 | Hung et al. |
| 2018/0145838 A1* | 5/2018 | Wang .................... H04L 9/3278 |
| 2018/0176012 A1 | 6/2018 | Hung et al. |
| 2018/0278418 A1 | 9/2018 | Chang et al. |
| 2019/0116028 A1 | 4/2019 | Liu |
| 2019/0138753 A1 | 5/2019 | Wallrabenstein |
| 2019/0165956 A1 | 5/2019 | Adham et al. |
| 2019/0215168 A1 | 7/2019 | Wu et al. |
| 2019/0238519 A1 | 8/2019 | Bikumala et al. |

\* cited by examiner

KEY EXCHANGE SCHEMES WITH ADDRESSABLE ELEMENTS

CROSS-REFERENCE TO RELATED APPLICATIONS

This application is a divisional of U.S. patent application Ser. No. 16/297,438 entitled "KEY EXCHANGE SCHEMES WITH ADDRESSABLE ELEMENTS" and filed on Mar. 8, 2019, which claims priority to U.S. Provisional Patent Application No. 62/640,829 filed on Mar. 9, 2018.

STATEMENT REGARDING FEDERALLY SPONSORED RESEARCH OR DEVELOPMENT

This invention was made with government support under Grant No. FA8075-16-D-0001 awarded by U.S. Department of Defense. The government has certain rights in the invention.

FIELD OF THE INVENTION

The present disclosure relates to implementations of physically unclonable functions (PUFs) for cryptographic and authentication purposes. Specifically, the disclosure describes implementations of systems using PUFs that may replace existing public key infrastructures (PKIs).

BACKGROUND

Encryption is a method to prevent a third party from intercepting messages between two parties. Encryption generally involves converting a message from plain text into encrypted text, which can be safely sent over a non-secure channel because the encrypted text cannot by understood unless decrypted. The message can only be decrypted with a particular private key. In a symmetric encryption scheme, the same private key is used to encrypt and decrypt the message. This private key is a shared secret of the message sender and the intended recipient. A Public Key Infrastructure (PM) is an encryption scheme which uses an openly-available public key to allow the message sender and recipient to generate the same secret private key.

SUMMARY

The above features and advantages of the present invention will be better understood from the following detailed description taken in conjunction with the accompanying drawings.

In an embodiment, a computing device includes an array of addressable elements, wherein each addressable element is a hardware element that generates a substantially consistent response when interrogated. The computing device includes a processor coupled to the array of addressable elements and configured to communicate using a communication network. The processor is configured to execute instructions for receiving, using the network interface, a public key, processing the public key to produce at least a set of addresses, wherein each address in the set of addresses identifies one or more hardware elements in the array of addressable elements, generating a set of responses by interrogating the one or more hardware elements in the array of addressable elements identified by the set of addresses according to a set of reading instructions, appending the responses in the set of responses to generate a private key, receiving, using the network interface, an encrypted message, and decrypting the encrypted message using the private key to generate an unencrypted message.

In another embodiment, a computing device includes an array of addressable elements, wherein each addressable element is a hardware element which generates a substantially consistent response when interrogated, and a processor coupled to the array of addressable elements and configured to communicate using a communication network. The processor is configured to execute instructions for generating, using a random number generator, a random number, processing the random number to produce at least a set of addresses, wherein each address in the set of addresses identifies one or more hardware elements in the array of addressable elements, generating a set of responses by interrogating the one or more hardware elements in the array of addressable elements identified by the set of addresses according to a set of reading instructions, appending the responses in the set of responses to generate a private key, encrypting an unencrypted message using the private key to generate an encrypted message, and sending, using the network interface, an encrypted message.

In another embodiment, a computing device includes an array of addressable elements, wherein each addressable element is an element in a cryptographic table having a value, and a processor coupled to the array of addressable elements and configured to communicate using a communication network, the processor is configured to execute instructions for receiving, using the network interface, a public key, processing the public key to produce at least a set of addresses, wherein each address in the set of addresses identifies one or more elements in the array of addressable elements, generating a set of responses by reading the value of the elements in the array of addressable elements identified by the set of addresses according to a set of reading instructions, appending the responses in the set of responses to generate a private key, receiving, using the network interface, an encrypted message, and decrypting the encrypted message using the private key to generate an unencrypted message.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
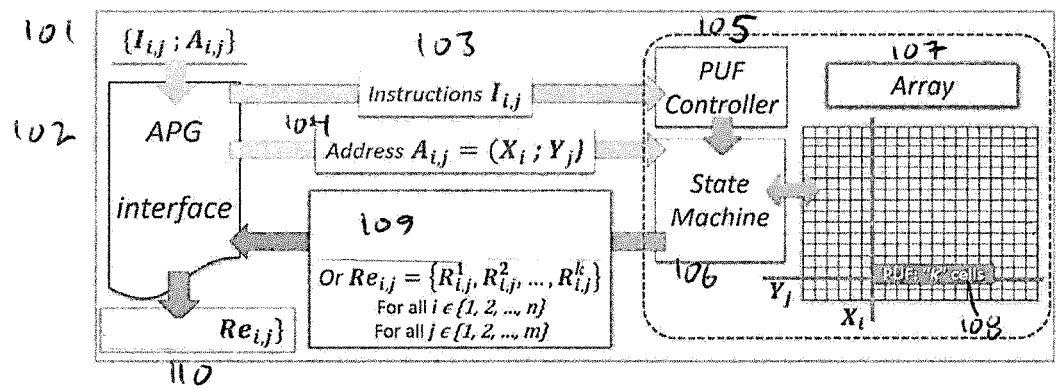
FIG. 1 is a block diagram describing the Addressable PUF Generator (APG) architecture

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

A public key infrastructure is a means for two parties to transmit information (a public key) over a non-secure public channel, which enables each party to generate a particular code (a private key) which is secure. This private key may be used to securely encrypt and decrypt messages between the two parties. In a symmetrical encryption scheme, the same private key is used for encryption and decryption.

In a PM, a public key serves as a prompt which allows the message sender and the message recipient to each generate the same particular private key. The public key is shared in a communication channel that is assumed to be insecure. As a simplified analogy: if a sender and a recipient each own an identical code book having a private key on each page, then the public key could be a page number randomly chosen by one party. That is, the public key provides enough information for the sender and the recipient to both find the same private key, but not enough information for a third party (without the code book) to find the private key.

Current standard PKIs are based on algorithms such as Rivest-Shamir-Adleman (RSA) and Elliptic Curve Cryptography (ECC), which use mathematical equations to generate public/private key pairs. In these methods, each user has a pair of keys: the public key that is openly shared and the corresponding private key that is secret. With RSA, the public key can be used by anyone to encrypt a message, while the private key is the only key capable of decrypting the message. With ECC, the public key of the receiving party combined with the private key of the encrypting party is the same as the public key of the encrypting party combined with the private key of the receiving party (i.e. A*B=B*A). This allows both parties to generate the same private key, allowing the use of any symmetrical encryption algorithm to protect the communication between both parties. Symmetrical algorithms such as AES-256 use the same key to encrypt and decrypt messages. When combined with key exchange protocols like the Elliptic Curve Diffie-Hellman Key Exchange (ECDHKE), symmetrical algorithms allow for PM implementation.

PM algorithms such as RSA and ECC rely on processes that are computationally easy to do but difficult to undo. As one example, it is easy to multiply two large prime numbers but very difficult to factor the resulting product. This difficulty protects the encrypted data from being decrypted without the private key. Quantum computers, currently under development, may allow for easier and faster means of performing certain mathematical operations such as factoring large numbers. This development would weaken many of the current standard PKIs. This potential vulnerability requires the development of novel PKIs which are more resistant to mathematically-based cryptanalysis.

Furthermore, existing PKIs require distributed users (e.g. computers, smartphones, smartcards) to locally store their private keys in non-volatile memory. A loss of the public keys to a malicious user is irrelevant because this is "public" information; however, a loss of the private keys represents the termination of the trust in the PM. Currently, side channel attacks are often effective at extracting private keys from connected devices elements and secure processor-based devices. Side channel attacks include methods of extracting private information by monitoring unintended signals emitted by devices (e.g. processor timing signals, power usage signals, radiofrequency signals).

The present disclosure provides a cryptographic scheme having advantages over existing PKIs. A first component of this scheme may include using secure cryptographic tables as a means to generate private keys from public keys. These tables are addressable: they use arrayed elements to pair the table input (the requested address) with the table output (the elements located at the address). This scheme of using an addressable cryptographic table is herein referred to as a Public Key infrastructure that is Addressable (PKA). The PKA serves to complement or replace standard mathematically-based PM cryptographic methods. Because it does not use mathematical operations (e.g. multiplication of large primes) to generate private keys, a PKA is resistant to mathematical cryptanalysis.

A second component of this scheme is the usage of physical unclonable functions (PUFs) for the user device cryptographic table. A PUF is an identifier that serves as a "digital fingerprint" for a piece of physical hardware, by measuring the small differences between each PUF that arise in the manufacturing process. These small variations are unique to each PUF, and are not predictable. The present invention may use PUFs rather than standard non-volatile local memory storage for the generation and the user device storage of the cryptographic table used for the PKA. By using PUFs rather than standard storage, the user device is resistant to exposing private keys by side-channel memory attacks.

The initial set-up step of the PKA, also referred to as personalization, is the creation of matching cryptographic tables between the client device and the secure server of the network. The PKA is based on client and the server each having access to identical cryptographic tables. The cryptographic tables may be stored on each device, or may be generated as needed, such as by querying an array of PUF devices, as detailed herein. The cryptographic tables serve as identical "code books" for each party. During personalization, the cryptographic table is securely uploaded to the server from the client user device. The client device may be a terminal device, a secure microcontroller, or a smartcard, or other. The server and device each have means to securely store the matching cryptographic tables (e.g. non-volatile memory, or hardware-based storage).

The public key of the PKA is the information needed to generate a particular private key from the cryptographic table. The public key is openly shared in a communication channel that is based on binary logic and is assumed highly insecure. Only the server and the client's device can independently generate a binary private key. As it is done with Elliptic Curve Cryptography (ECC) or Quantum Key Distribution (QKD), PKA is a key exchange scheme. The private keys after key exchange are used to encrypt and decrypt messages and perform authentication cycles, establishing a secure communication environment between server and client.

In its basic form, the public key of PKA is a particular address $A_{i,j1} = \{X_i, Y_j\}$ in a cryptographic table C. The private key can be the stream $Pr_{i,j1} = C_{i,j1} = \{C_{i,j11}, \ldots, C_{i,j1k}\}$ of k bits that are located in the cryptographic table C following the address Ai,i1. If the address pointed by the public key is located at the end of a row, the k bits needed for the private key can be extracted from the rolling following rows in the table. If the address pointed by the public key is located at the bottom of the table, the rolling following rows can be located at the top section of the table in such a way that a fixed length (e.g. 256 bits) is always extracted for the private key. Only the server and the client with the appropriate cryptographic table can generate the same private key for the PKA protocol, a third party without the correct cryptographic table (table C) cannot generate the same private key (stream Pr) from the public key (table address A).

Rather than storing a private key or cryptographic table in standard non-volatile memory on the client device, an embodiment of the present encryption scheme uses inherent properties of the device hardware to generate and store the cryptographic table. One example of such a scheme uses PUFs. PUFs exploit the manufacturing variations introduced during device fabrication, such as local variations in doping levels of semiconducting layers, which make all devices slightly different from each other.

Each PUF is uniquely identifiable by its particular physical properties. These properties may be interrogated by a challenge-response protocol or by a built-in self-test. In the case of challenge-response protocol, a signal is applied to the PUF and the output is measured. In the case of built-in self-test, the test measures a particular property of the PUF hardware. The measurement may be compared to a given threshold T to produce a binary response: 0 if the measured parameter is below the threshold, 1 if above.

The term PUF may refer to a single element or a set of elements. To use a set-of-elements PUF for authentication, an authenticating party (e.g. a server) interrogates the PUF and compares the set of generated responses with the set of the previously-measured responses stored on, e.g., the server. This authentication check gives a positive result when the rate of matching response is high enough.

To allow for this authentication process, a PUF-containing device and an authenticating server must perform an initial set-up process (personalization). Prior to the personalization process, the physical PUF at the client side may be "mapped" to generate a look up table of digitally-stored responses corresponding to the behavior of the PUF elements at each address. The physical PUF is only present on the one connected device. The authenticating party (e.g. the server) may receive and store a digital look up table containing this mapping of the responses of the physical PUF elements. Prior to any in-the-field authentication of the device, the initial set-up or personalization step can be based on the secure transfer of this response look up table from a client device to a secure server of a network.

Rather than a single-element PUF, the present encryption scheme utilizes an addressable array of PUF elements. This array of unique elements serves as a cryptographic table C which is securely locally stored. Each connected device (e.g. a terminal device or a secure microcontroller) contains a unique hardware-based cryptographic table comprising an array of addressable elements such as addressable PUF generator (APG) which is part of the circuitry embedded in the connected device. APG arrays are designed with a large number of PUFs. Memory arrays can be utilized as elements to generate large number of addressable PUFs within one device. Usually PUFs are designed with only a small number of cells k (in the 128 to 256 range) while the size of the memory arrays commercially available needed to design APGs have densities in the megabyte range.

FIG. 1, for example, depicts a block diagram showing the architecture of an APG. A processor of a server or device passes a request 101 into the APG interface 102. The APG interface 102 parses apart the request into PUF instructions 103 and PUF addresses 104. The instructions 103 may be use to modify which PUF elements are read during processing by the PUF controller 105. The state machine 106 interprets the original addresses 104 with possible modification by the controller 105 and the data streams read from the PUF array 107. Within the PUF array 107, a series of k successive cells following the address "$A_{i,j}$" can become the PUF 108 "i,j", wherein the PUF 108 is considered to be the series of k cells. Alternatively, the state machine 106 may modify the reading addresses 104 to access, for example, a non-successive series of k cells as the PUF 108. The state machine 106 then transmits the series of PUF responses 109 generated by the particular PUFs 108. This series of responses 109 is then passed out by the interface 102 as the final APG output stream 110 for further use by the processor of the server or device. The address 104/instruction 103 pair $\{A_{i,j}; I_{i,j}\}$ identifies the PUF 108 "$_{i,j}$", with possible modifying instructions 103 used to generate the stream of responses 109 $Re_{i,j}=\{R_{i,j1}, \ldots, R_{i,jk}\}$. Example modifying instructions may include: reading responses from every 2nd, 3rd, or Nth element rather than from every successive element, reading responses from elements spaced by an interval depending on the contents of each prior element, reading from vertically successive elements rather than horizontally successive elements, reading from elements at an "angle" though the array rather than horizontally or vertically, and reading responses with modifying instructions depending on the count of prior reading occurrences at the address, among many other possible modifying instructions.

Figure 2:
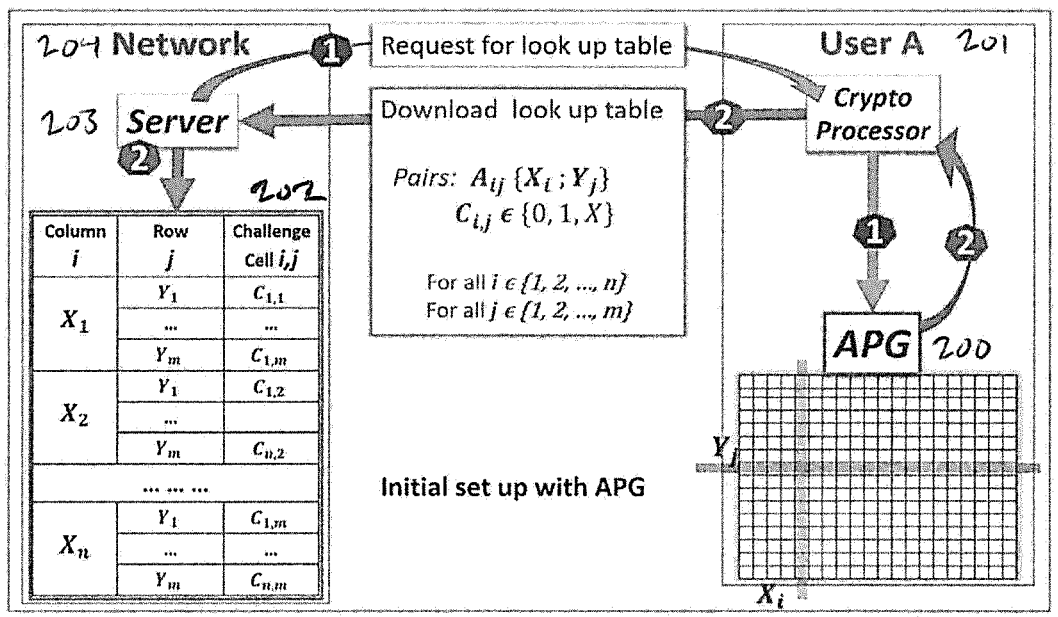
FIG. 2 depicts an initial step wherein a cryptographic table is downloaded from the APG to the server's memory.

As shown in FIG. 2, during an initial set-up process, the physical APG 200 at the user side device 201 securely generates a look up table 202 of digitally-stored responses to fully reproduce the behavior of the APG 200. The physical APG 200 itself is only present on the one connected device 201. The other communicating party (e.g. the server 203) stores a cryptographic look up table 202 containing the same information as look up table generated by the APG 200. Because these stored responses 202 may be used to interrogate the user device 201 to verify identity, the elements of the look up table 202 are referred to as challenges.

This first step of the present scheme, the personalization step, can be based on the secure transfer of this cryptographic look up table 202 from the client device 201 to the secure server 203 of the network 204. The cryptographic look up table 202 uploaded to the server 203 contains the address of each PUF of the APG 200 and their corresponding PUF response information (the challenge). These addresses and instructions on how to generate the responses can act as the "public keys" of the present schemes. The public key is used by each party (e.g. the device 201 and the server 203) to generate matching private keys.

In order to account for the error rate of the physical APG 200, approaches may suggest the use of ternary states in the stored look up table 202 created during the personalization step. Within these ternary states, $Ch_{i,jf} \in \{0, 1, X\}$ with $f \in \{1, \ldots, k\}$. The "X" cells within the k cells are unstable or were measured close to the threshold value T, while the "0", or "1" cells are predictable. The stability or instability of a given cell for a given challenge is revealed by taking multiple response measurements during the process of generating the look up table 202 from the physical APG 200.

For each address, $A_{i,j}$=the challenge may described by ternary states $Re_{i,j} \in \{0, 1, X\}$. Within the look up table 202, the "0" state may be stored in binary as (01), the "1" state stored as (10), and the ternary "X" states as (11) or (00). For example, if n=256 and m=256, there will be 65,536 cells with corresponding ternary values in the table.

As an example usage of an APG 200, an authentication process may interrogate a subset of PUFs and compare the generated responses from the device 201 with the previously-measured challenges stored in a look up table on an authenticating secure server 203. This authentication check gives a positive result when the rate of matching challenges and responses is high enough.

Figure 3:
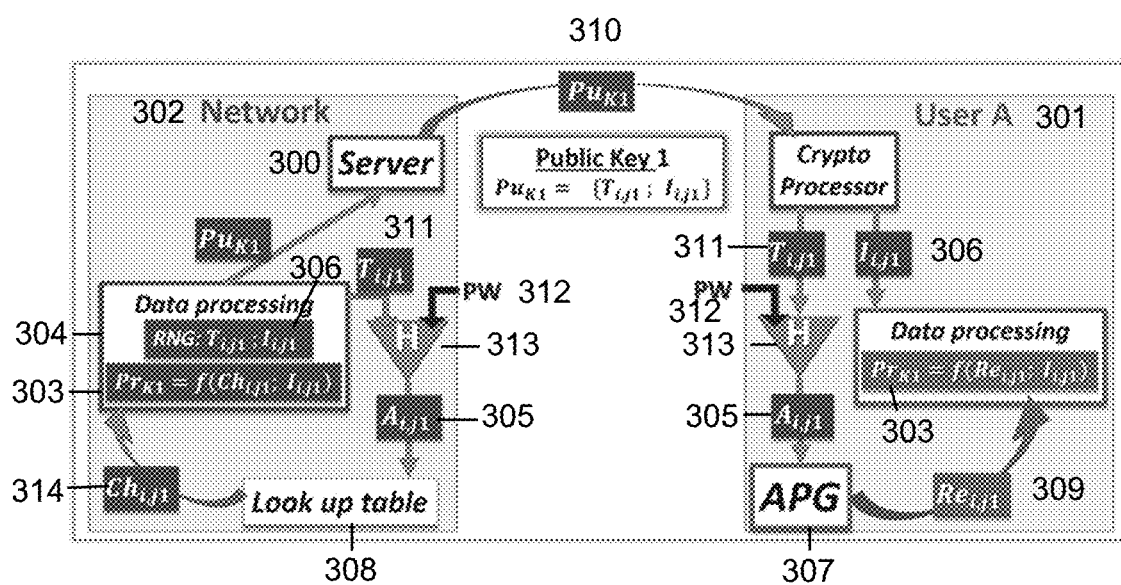
FIG. 3 depicts an exchange of public keys between the server and the user.

The process of private key coordination is shown in FIG. 3. For a server 300 and a client user device 301 to communicate by encrypted messages over a network 302 requires the private key 303 on the device side and the private key 303 on the server side to be identical. The private key 303 coordination process is initiated by the data processing element 304 of the server. The k cells located at and after address $A_{i,j1}$ 305 are accessed in the APG 307 and the matching look up table 308 to retrieve matching sets of responses 309 and challenges 314, respectively, with matching elements.

The instruction set 306 may include a binary data stream for masking, $I_{i,j1}=\{I_{i,j1}, \ldots, I_{i,jk}\}$, with the following description: If $Ch_{i,jj}=X$ (i.e. an undetermined challenge, corresponding to an unstable PUF element during the initial response mapping process), then the masking bit $I_{i,jj}=0$. A random number generator may be used to assign additional 0's in the $I_{i,j1}$ masking data stream of the instruction 306, and all remaining positions in the $I_{i,j1}$ masking data stream are 1's. A malicious user having access to an APG 307 may not be able to correctly extract the responses 309 without knowing the instruction 306 $I_{i,j}$.

The cryptographic look up table 308 and APG 307 can each be considered cyclic if an address 305 $A_{i,j1}$ located toward the end of the table may be interpreted by considering any out-of-bounds cells (of the k requested cells) to be instead accessed from top of the table (i.e., if a requested address includes cells beyond the table 308 or APG 307 size then the table 308 or APG 307 reads cells from the modulus of the table 308 or APG 307 size).

Addressable PUF Generators (APG) 307 based on memory arrays contain PUFs having responses 309 which may serve as random elements in a cryptographic table. The cryptographic table functions as table $C_{i,j1}=\{C_{i,j11}, \ldots C_{i,j1k}\}$ in the previously-described PKA architecture, with each element within table C being a PUF. Within the APG 307, using addresses 305 $A_{i,j1}$, the responses $Re_{i,j1}=\{Re_{i,j}i1, \ldots, Re_{i,j1}k\}$ are measured. The responses $Re_{i,j1}$ are appended to generate the private key 303 $Pr_{i,j1}$. If the client device is hacked, the arrays of PUFs cannot be directly read. This property enhances security.

The private key 303 $Pr_{K1}=f(Re_{i,j1}, I_{i,j1})$, where function f( ) includes either the response generation by either the physical APG or its digital reproduction CRP (challenge response pair) look up table, is a stream of p binary bits $\{Pr_{K11}, \ldots, Pr_{K1P}\}$ which is generated the following way: If masking bit $I_{i,j1}k$ is a 0, then the corresponding challenge $Ch_{i,j1}k$ is eliminated from the data stream of ternary states from the look up table or the corresponding response $Re_{i,j1}k$ is eliminated from the data stream of responses. If n-p bits of $I_{i,j1}$ are 0's, then p bits will be left on the data streams of challenges and responses. The p bits left on the stream of challenges are all binary, because all ternary bits were removed. The resulting data stream after masking the challenge or response stream is the private key: $Pr_{K1}=\{Pr_{K11}, \ldots, Pr_{K1P}\}$.

The public key 310 $\{A_{i,j1}, I_{i,j1}\}$ is then shared openly by the server 300 to the user 301. The knowledge of both the address 305 $A_{i,j1}$ and the instructions 306 $I_{i,j1}$ (including masking bits) allows the user to generate a stream of responses $Re_{i,j}=\{R_{i,j1}, \ldots, R_{i,jk}\}$, and a duplicate of the private key 303 $Pr_{K1}=f(Re_{i,j1}, I_{i,j1})$. It is assumed here that by blanking enough cells with X's, the remaining unblanked cells are extremely predictable with all challenge vs. response error rates at zero. Additional error correcting methods can be used to further enhance the reliability of the method.

For example, if k=1000 in the 256×256 table, a particular data stream of instructions applied at $A_{i,j}$ can include a masking stream have 300 cells blanked with "X", and additional 200 cells blanked by the random number. The resulting masking stream $I_{i,j1}$ will have 500 0's, and 500 1's. In this example, the private key is a data stream of 500 bits, and this considering that 300 bits are blanked X's due to their marginal quality. An additional 200 bits are blanked to hide the key. In case of poor memory quality, the number of blanked X cells can be increased to a much higher ratio or a different address in the cryptographic table can be chosen.

The number of possible public keys of such a protocol can be extremely high. For example, if k=1000, if the number of "X" cells is 300; thus, the number of possible ways to blank an additional 200 cells with the instructions described above is $$\binom{700}{200} = 2 \times 10^{180}.$$

At this point, both parties (server 300 and user device 301) are independently sharing the same private key 303, ready to communicate over the network 302 through the novel encryption scheme. It is assumed that a third party can intercept the public key 310; however, without either the cryptographic look up table of challenges 308 or the physical APG 307, it is not possible to re-construct the private key 303. The method allows the use of private key 303 without actually transmitting sensible information to a third party. The PUFs of the APG 307 are not readily readable through side channel attacks, and the information contained inside the APG 307 is secure and it only available when accessed.

Considering that symmetrical encryption algorithms with long keys are secure, the key exchange protocols can be the weakest point of the schemes. A new public key 310 can be generated by the server after each cycle of encryption-decryption further strengthening the trustworthiness of the protocol. It is also possible to establish, both on the server side and the client side, a tracking of all previously-used public keys 310 in such a way that they will not be used a second time by a third party.

In this protocol, a malicious user with access to the public key can get access to potentially useful information, such as the address 305 within the APG 307 and the instruction set 306 to extract the responses. However, this information is not enough to expose the private keys 310. Additionally, multi-factor authentication can be added to the encryption schemes.

Hash functions are important one-way cryptographic methods able to convert messages of various lengths into fixed-length data streams. Good hash functions such as SHA-256 have low rates of collision such that two different messages have an insignificant probability of having the same hash digest. Another important property is to be image-resistant; changing only one bit of a message should produce a hash digest that is completely different from the original one.

A binary random number 311 $T_{i,j1}$ may be generated by a server to create a public key 310. Under one example scheme, the public key 310 is later parsed apart into addresses 305 $A_{i,j1}$ and instructions 306 (including masking bits). The random number 311 $T_{i,j1}$ may be processed by a hash function 313 with an additional password 312 or pin code. The password 312 can be a data stream of any length and of any origin such as a pin code, a biometric print (e.g., fingerprint, vein, retina), or the like. This password 312 must be known by both parties as part of this protocol. The message digest produced by the hash function 313 may be parsed apart from being a single stream of bits into a series of shorter chunks of a given length to generate the address 305 $A_{i,j1} = \{X_i, Y_j\}$ in the cryptographic table 308 and the corresponding instructions 306. The password requirement renders a third party unable to correctly find the address 305 $(X_i, Y_j)$ inside the cryptographic table 308 from the public key 310. If, for example, a ternary cryptographic table 308 is a 256×256 array, the first eight digits of an output from a hash function 313 can be an address of the column Xi, and the next eight digits can be the address of row Yj. The private key 303, $Pr_{i,j1} = Re_{,j}1 = \{Re_{i,j11}, \ldots Re_{i,j1}k\}$, is then the stream of k binary bits located in the cryptographic table 308 at address 305 $A_{i,j1}$ as interpreted by instructions 306 $I_{i,j1}$. The public key 310 transmitted is $Pu_{i,j1} = \{T_{i,j1}\}$. The user 310 can generate again the addresses 305 $A_{i,j1}$ and instructions 306 $I_{i,j1}$ by using the same hash function 313, the same password 312, and the same random number 311 $T_{i,j1}$. Thereby, the same private key 303 $Pr_{i,j1}$ is generated from the APG 307. In this method, the random number 311 $T_{i,j1}$ can be dynamically changed to a different number $T_{i,j2}$ prior of the following communication between parties, resulting in a different public key 310 $Pu_{i,j2} = \{T_{i,j2}\}$, different addresses 305 $A_{i,j2}$ and instructions 306 $I_{i,j1}$, and a different private key 303 $Pr_{i,j2}$.

Figure 4A:
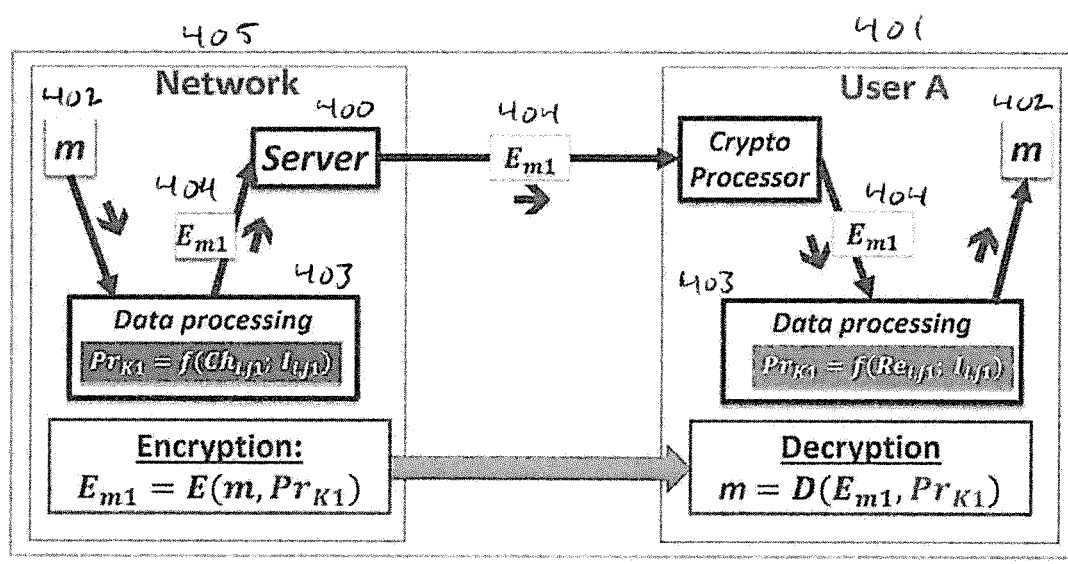
FIG. 4A depicts the encryption of a message sent from the server to the user.
Figure 4B:
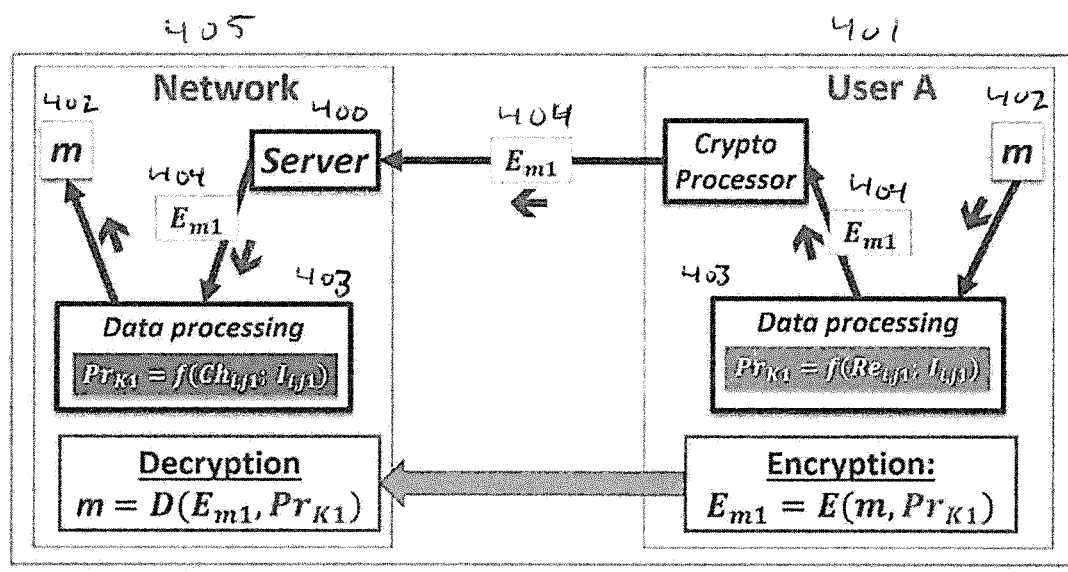
FIG. 4B depicts the encryption of a message sent from the user to the server.

After the private keys are coordinated as describe in FIG. 3, the private keys can enable secure two-way symmetrical encryption as shown in FIG. 4A between the server 400 and the user device 401. An original message 402 is encrypted by the private key 403 to produce an encrypted message 404. This encrypted message is transferred by the server 400 over the non-secure network 405 to the user device 401. The received encrypted message 404 on the user device is then decrypted using the private key 403 on the user device to reproduce the original message 402 on the user device. This process may be reversed as shown in FIG. 4B to send a message from the user device to the server.

The cryptographic tables can be designed with any multi-state memory, storing two, three, or more bits per cell. The schemes can be extended to any multi-state combination including, not limited to, binary communication and binary storage in the cryptographic table.

The concept of pointing to multiple addresses within a memory array has been used to enhance electronic and cryptographic systems. Examples include the use of layout permutation for higher randomization; the protection of mobile phones; the prevention of intruders from locating target functions; the prevention of binary code injection attacks; construction of a pseudorandom invertible permutation; fortification of networked systems against buffer overflow attacks; reconstruction of RSA private keys; and increase the durability of memory devices by using multiple addresses.

The schemes discussed herein may have a large number of collisions (i.e., the same private key can be generated by a large number of distinct public keys). For example, if the random number $T_{i,j1}$ has 512 bits, the number of possible public keys is $2^{512} = 1.34 \times 10^{154}$; a cryptographic table of 256×256=65,536 cells and only 65,536 different $A_{i,j1}$ positions available. Thus, on average each position shares $1.34 \times 10^{154}/65636 = 2 \times 10^{149}$ keys. In order to increase the number of possible configurations per public key, two schemes are described: 1) Generation of multiple addresses from the message digest of the hash function; 2) Read data stored in the cryptographic table as an additional instruction. These two schemes can also be combined to further strengthen the cryptographic protocols.

The message digest generated by a commercial hash function such as SHA-2 or SHA-3 can be 512-bit long or more. Multiple addresses of the cryptographic table of the PKA can be extracted from each message digest.

Figure 5:
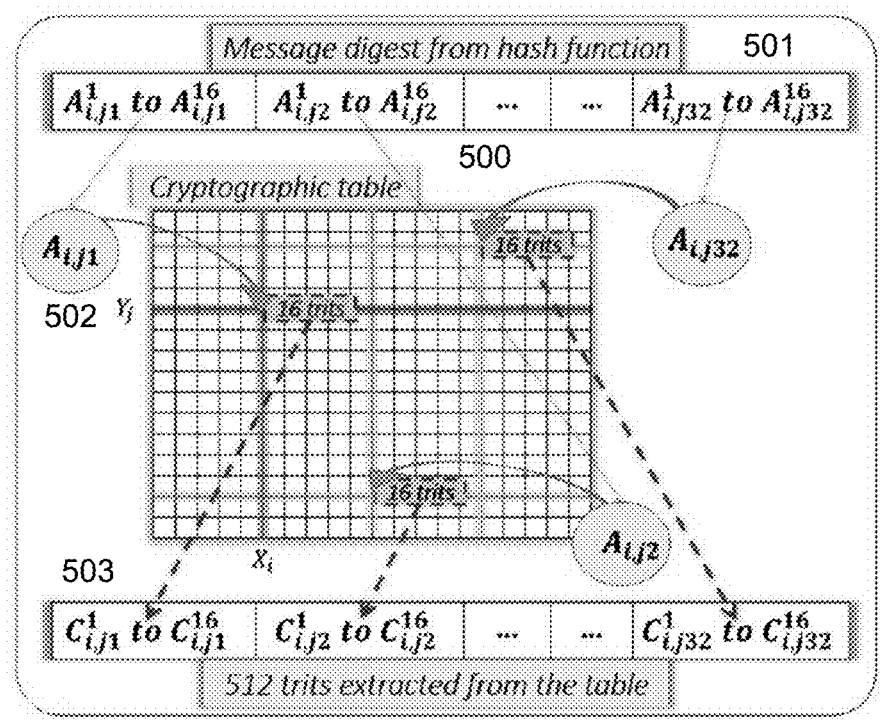
FIG. 5 depicts a process of extracting multiple addresses from a message digest.

As shown in FIG. 5, when the size of the cryptographic table 500 is 256×256, it is possible to extract 32 different addresses from a 512-bit long message digest 501: $A_{i,j1}$ can be extracted from the first 16 bits of the message digest, $A_{i,j2}$ from the next 16 bits, all the way to $A_{i,j}32$ from the last 32 bits. To extract the table result 503 $C_{i,j}$ and get 512 trits, it is then possible to read the 16 bits following each of the 32 addresses. If the cryptographic table 500 contains true random numbers, there are 216 possible combination for each of the 32 addresses; if each address can be picked from anywhere in the cryptographic table, then the total number of possible configurations is $(2^{16})^{32} = 2^{512} \approx 1.34 \times 10^{154}$. This number of possible configurations is slightly reduced with a constraint that assumes that the 32 addresses cannot overlap with each other.

The example discussed above of a 256×256 table 500 with a 512-bit long message digest 501 can be generalized to tables of different sizes and shorter and longer message digests. Cryptographic tables of smaller sizes than 256×256 and the same 512-bit long message digest could be segmented in more than 32 addresses. For example, a 64×64 cryptographic table can be segmented into 42 addresses; a 1024×1024 table can be segmented into 25 addresses.

Figure 6:
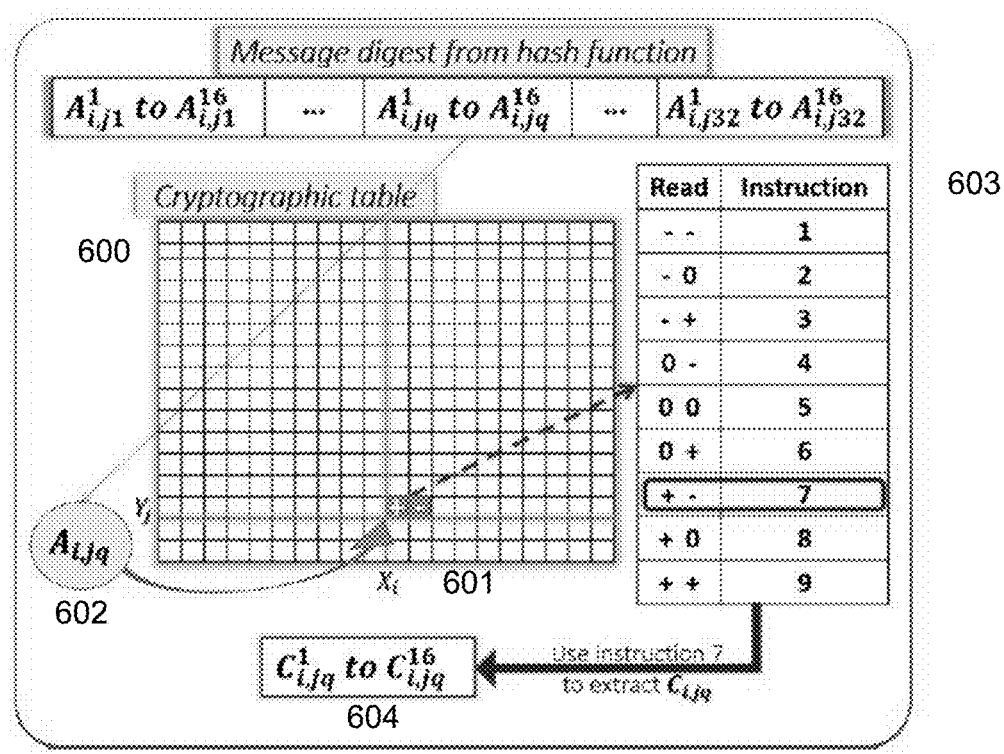
FIG. 6 depicts a method of extracting secondary reading instructions from a cryptographic table.

For a cryptographic table 600, another method to increase the possible combinations is to read a subset 601 of data located around the address 602 $A_{i,jq}$ and use this information to access a set of additional instructions 603 on how to generate the data stream 604 $C_{i,jq}$ from the cryptographic table 600. In the example shown in FIG. 6, the trits 601 located at and adjacent to location 602 $A_{i,jq}$ are read, and a digital number from 1 to 9 is extracted. This extracted number, 7 in FIG. 6, can be used to as instruction #7 in the instruction table 603 to generate the output trits 604 $C_{i,jq} = \{C_{i,jq1}, \ldots, C_{i,jq}16\}$ from the cryptographic table 600. This secondary instruction procedure adds entropy to the table-reading process.

As an example of a "secondary instruction", the spacing to extract the trits following the location 602 $A_{i,jq}$ can be edited or spaced with the number read in the pair of cells. In the example shown FIG. 6, a "+−" 601 at address 602 $A_{i,jq}$ triggers the selection of the trits stored every seven cells in the cryptographic table 600. Each different address in the cryptographic table 600 has different pairs of trits, different instructions, and the generation of their stream of trits will be differently spaced. With this edit spacing method, there are nine different ways in the instruction table 603 to extract 16 hits located past the different 32 addresses. The number of possible configurations is increased by (9)32=3.4×1030. This method can further increase the number of configurations by reading longer streams of trits 601 following each address. Reading eight trits will yield (83)32≈5×1086 configurations.

The instruction "edit spacing" can be replaced by any set of instruction needed to compute and extract the output trits 604 following the location 602 $A_{i,jq}$ with each different address in the cryptographic table having different instructions 603.

Frequency analysis is a generic method to break cryptographic protocols that handle streams of bits of constant length. Block ciphers like Advanced Encryption Standard (AES) usually encrypt blocks of 128 bits at each operation. The encryption of long plain text with thousands of words with millions of 128 blocks could be exposed to frequency analysis. The combination of the two methods described above can be effective to mitigate such attacks. For example, each of the 32 addresses shown FIG. 5 can be used to extract chunks of 16 trits with different spacing and therefore are not following a predictable sequence. The reading of the trits can vary address to address resulting in non-repetitive patterns. The information is coming from the table itself, not the public key; this further increases the number of possible pairs of public/private keys combinations. The ternary information extracted at each address can be used in many other ways to protect the scheme from frequency analysis. For example, the numbers 0 to 8 read on the two trits located around $A_{i,j1}$ can be used to vary the length of the chunk of trits extracted; for a read with a 0, this length is 16; for a read with 1, the length is 17. A read with a 2 has a length of 18, a read with a 3 has a length of 19, and so on. The total number of chunks to extract 512 trits does not have to be 32 anymore and can vary for each public key.

Figure 7A:
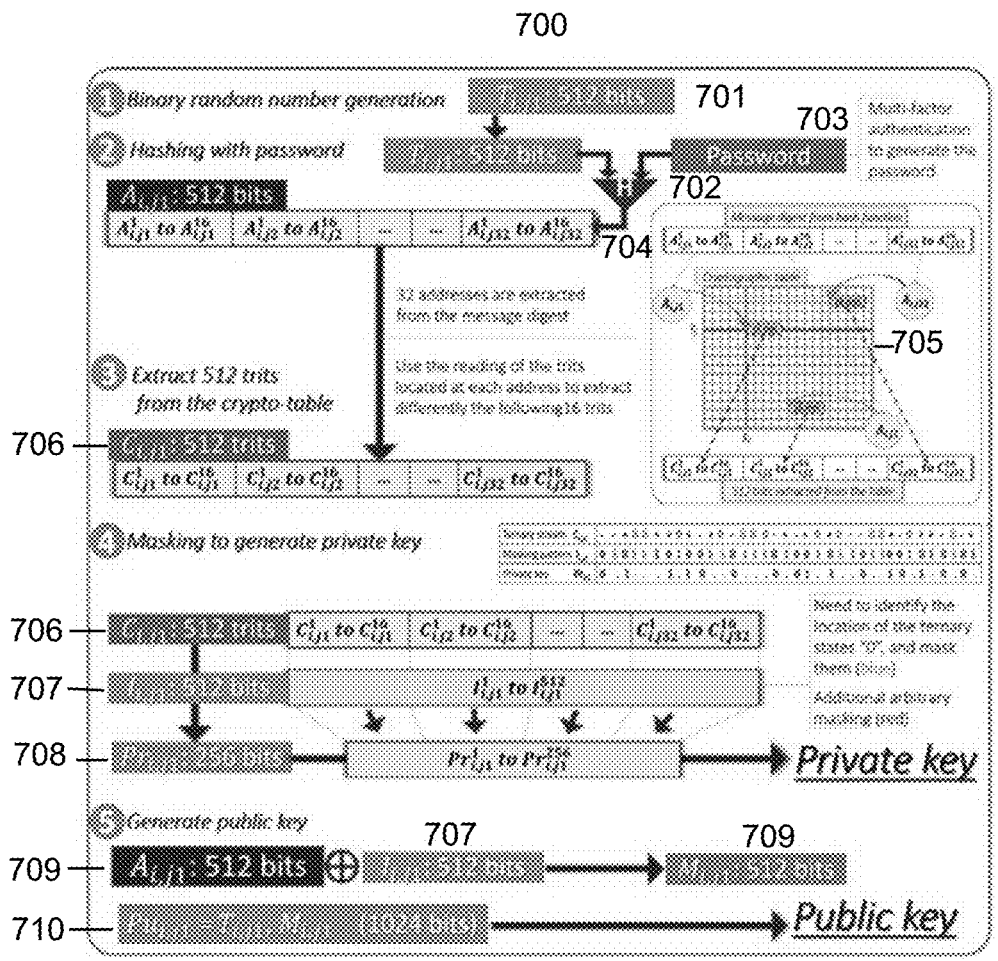
FIG. 7A depicts the addressable public key encryption and decryption algorithm on the server side for sending a message.
Figure 7B:
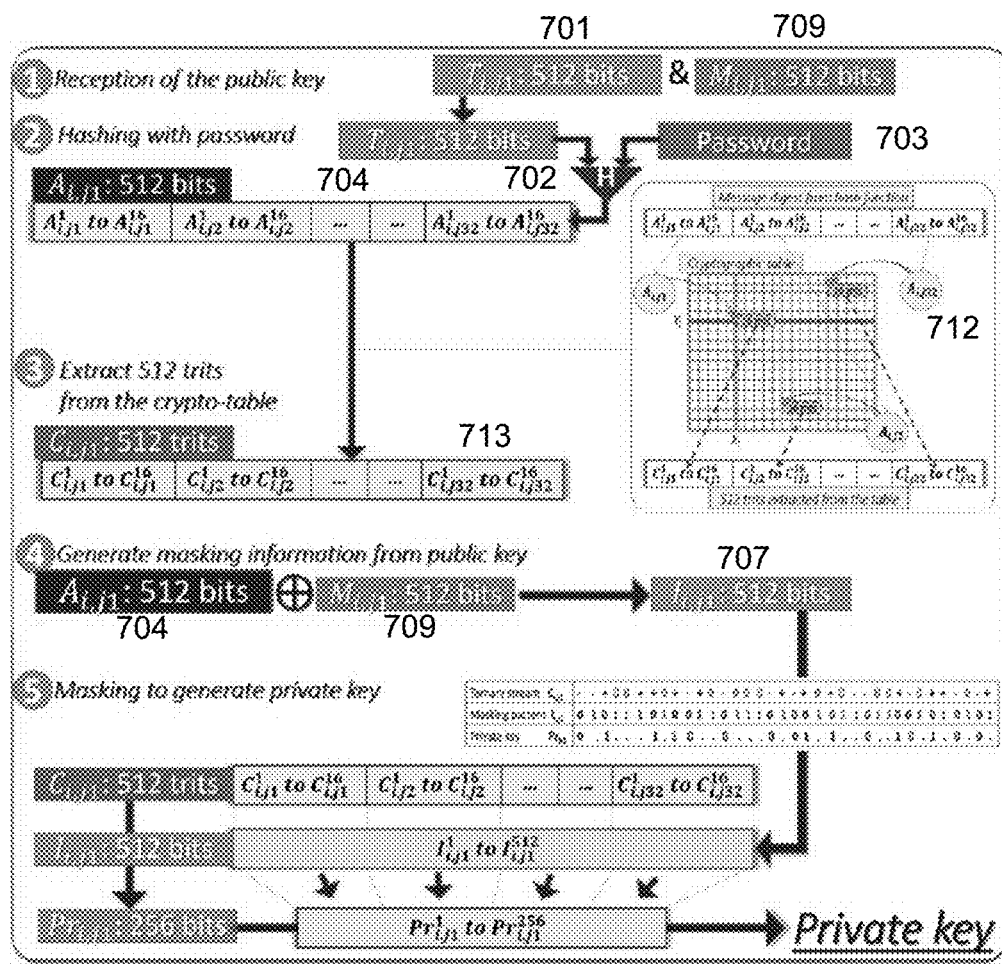
FIG. 7B depicts the addressable public key encryption and decryption algorithm on the client side for receiving a message.

The integration of the new key exchange scheme as part of the PKA protocol is summarized below in FIGS. 7A and 7B for a message sent from a server to a user device. At the server 700 side (FIG. 7A), the protocol starts with step 1, generation of a random number 701 $T_{i,j1}$. Because there is a need to generate a public/private pair of keys at every authentication cycle, this is achieved by generating a new random number 701. During step 2, a hash function 702 combines the random number 701 and a password 703 to generate a hash message digest 704 $A_{i,j1}$. The hash message digest 704 is interpreted as a set of addresses within the cryptographic table 705. A set of challenges 706 $C_{i,j1}$ are extracted from the cryptographic table 705 during step 3, incorporating both the generation of multiple addresses 704 from the hash message digest and the use of secondary instructions based on information stored in the cryptographic table 705. This step converts binary information, $A_{i,j1}$, into ternary information $C_{i,j1}$. Step 4 generates the private key 708 using a set of masking bits 707 incorporated in the instructions to blank specific bits from the original challenges 706. Step 5 generates the public key 710 by combining the addresses 704 and instructions 707 into a single stream M 709 including the blanking bits, which is then combined into a public key 710 containing all needed information. The public key 710 includes the random number 700 and the instructions 707 (with relation to the addresses 704).

On the client user device 711 side (FIG. 7B), the protocol to generate the matching private key 708 from the APG 712 is similar to the above. In step 1, the random number 701 and the combined address and instruction steam 709 are received from the server. In step 2, the hash function 702 combines the random number 701 and a password 703 to generate a hash message digest 704 $A_{i,j1}$. The hash message digest 704 is interpreted as a set of PUF addresses within the APG 712. In step 3, a set of response bit 713 $R_{i,j1}$ are extracted from the APG 712, incorporating both the generation of multiple addresses 704 from the hash message digest and the use of secondary instructions based on information stored in the APG 712. Step 4 generates the masking bits 707 from the added public key information 709. The final step 5 generates the private key 708 using a set of masking bits 707 combined with the original APG responses 706.

The encryption schemes described herein can be used for authentication after initial set-up steps are executed. One reliable way to authenticate a user is to ask the user to respond to the server's public key exchange with an encrypted message by the private key. An unauthorized user may not have an addressable element to generate the private key. This could be very useful to authenticate the Internet of Things (IoT), banking cards, smart passports, SIM cards, transport title, smart phones, and any connected devices.

In some embodiments, a network can be authenticated by the users by sending both a public key and an encrypted message with the private key. The user will then generate its own private key and decrypt the message. The integrity of the message is a guarantee that the network has access to a valid cryptographic table. This would be very valuable to block malicious networks trying to drive connected devices such as drones, unmanned aerial vehicles (UAVs), electric vehicles, airplanes, Smart grit, financial terminals, or any sensitive peripheral elements.

In various embodiments, encryption schemes between a network and a client device which contain arrays of addressable PUF generators, are based on the generation, and exchange of public keys and private keys may be operated in the following way. During a personalization step, cryptographic tables containing the challenges of the arrays of PUFs within the addressable PUF generators are downloaded to the memory of the network. These cryptographic tables are organized by PUF address and corresponding challenges. In order to generate a particular private key in the network side, the stream of PUF challenges stored in a particular address within the cryptographic table is extracted. Following a particular set of instructions, these challenges are used to generate a first binary data stream (the private key). The particular address and the particular set of instructions are described by a second binary data stream (the public key). The public key is shared with the client device. Using the public key, the client device can find the address of the same PUF used by the network and the same set of instruction generating the responses, thereby the same private key. The network and the client device then encrypt and decrypt messages by using symmetrical cryptography and the shared private key.

In other embodiments, encryption schemes between a network and client device with addressable memory elements that are based on the generation and exchange of public keys and private keys may operate in the following way. During a personalization step, cryptographic tables are downloaded to the memory. These cryptographic tables are organized by address within the memory array and corresponding stored data. In order to generate a particular private key in the network side, the stream of data that is stored in a particular address within the cryptographic table is extracted. Following a particular set of instructions, this stream of data is used to generate a first binary data stream (the private key). The particular address and the particular set of instructions are described by a second binary data stream (the public key). The public key is shared with the client device. With the public key, the client device finds the same address in the memory used by the network and finds the same set of instruction generating the same private key. The network and the client device then encrypt and decrypt messages by using symmetrical cryptography and the shared private key.

In some cases, the arrays of physically unclonable functions that are part of the client device are designed with SRAM memories, DRAM memories, Resistive RAM memories, magnetic memories, Flash memories, EEPROM memories, OTP memories, arrays of ring oscillator PUFs, gate delay oscillators, optical PUFs, Sensors, and MEMS PUFs.

The physically unclonable functions may have binary state, ternary state, quaternary state, or other multi-states. The additional states of the PUFs may have the purpose to reduce the challenge-response-pair error rate or to increase the entropy. The instruction set may be a binary data stream produced with random numbers blanking or eliminating part of the challenges, responses, or data stream. The purpose of this additional blanking can be used to increase entropy. The random numbers may be true random numbers, or pseudo random numbers. The encryption methods may be AES, DES, triple DES, Blowfish, or any symmetrical algorithms.

In various embodiments, the client devices may be smart cards, SIM cards, banking cards, secure microcontrollers, Internet of Things (IoT), connected devices, ID cards, smart passports, transport titles, computers, workstations, telephones, smart phones, tablets, servers, base stations, drones, UAVs, Electric Vehicles, airplanes, satellites, or any other element connected to a physical cyber system.

The addresses of addressable PUFs and the addresses of memory arrays can be parameters such as the coordinates [X,Y] in the array. The cells can be following a particular angle within the array, multiple locations spread across the array, and combinations of these elements.

In some embodiments, the encryption methods are combined with additional cryptographic protocols to secure the communication within the network and transfer securely the information between the network and the client device. These additional protocols include public key infrastructure (PM), use of private keys, use of symmetrical (e.g., DES, AES), and asymmetrical cryptography (e.g., RSA), secret key exchange methods (e.g., quantum cryptography, Elliptic Curve Cryptography), hash function, and the use of biometric prints.

Peer-to-peer encryption may be provided with the network acting as a central commanding element. The encryption schemes may involve generating two sets of private-public keys: the first set supports the subsequent authentication of the network while the second set encrypts messages. New sets of private-public keys can be generated after each encryption-decryption cycle to strengthen security. The encryption schemes can also have an additional APG that is part of the network to download a cryptographic table in the client device, which allows the client device to act in a symmetrical way and generate private-public keys with the methods described above. The encryption schemes may also use an additional memory array that is part of the client device to download a cryptographic table in the network, which allows the client device to act in a symmetrical way and generate private-public keys.

The encryption methods described above may be modified to incorporate hash functions in both the network side and the user device. The hash functions can be one-way cryptographic functions, converting a shared password and a particular random number into a particular address within the arrays of addressable PUF generator. The cryptographic tables described above can be organized by random numbers and challenges; the public keys are the combination of random numbers and instruction sets; the resulting private keys and encryption schemes are unchanged. The hash functions can be hash functions such as SHA, and the passwords can be an alphanumeric passcode, a pin code, a fingerprint, retina print, or any other biometric authentication print.

The challenges produced by the applied addresses and instructions can act as the secure "private keys". To encrypt a message aiming at a user, the secure server can use any symmetrical encryption method, such as AES-256, and use a "private key" (i.e., a set of challenges). The secure server then transmits the cipher (i.e. the encrypted message) to the user together with the "public key" (i.e., specific addresses and instructions). Using the "public key", the user can extract the "private key" (i.e., the responses from the APG at the given addresses and instructions) and decrypt the cipher. The same method can be used by the user to send encrypted messages to the secure server. The public keys generated in the process can be changed dynamically after each authentication cycle in such a way that if a particular key is compromised, the impact is contained to a single event. The APGs can be designed with low cost commodity memory arrays with large numbers of addressable PUFs, and stringent error correcting methods to generate a large number of CRPs (challenge—response pairs) for cryptographic protocols with large entropy.

One skilled in the art will realize that a virtually unlimited number of variations to the above descriptions are possible, and that the examples and the accompanying figures are merely to illustrate one or more examples of implementations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments or implementations disclosed, but that such claimed subject matter may also include all embodiments or implementations falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment," "an embodiment," "one implementation," or "an implementation" may mean that a particular feature, structure, or characteristic described in connection with a particular embodiment or implementation may be included in at least one embodiment or implementation of claimed subject matter. Thus, appearances of the phrase "in one embodiment," "an embodiment," "one implementation," or "an implementation" in various places throughout this specification are not necessarily intended to refer to the same embodiment or implementation, or to any one particular embodiment or implementation described. Furthermore, it is to be understood that particular features, structures, or characteristics described may be combined in various ways in one or more embodiments or implementations. In general, of course, these and other issues may vary with the particular context of usage. Therefore, the particular context of the description or the usage of these terms may provide helpful guidance regarding inferences to be drawn for that context.

What is claimed is:

1. A computing device comprising:
    a memory;
    an array of addressable elements, wherein each addressable element is an element in a cryptographic table having a value;
    a processor coupled to the array of addressable elements and configured to communicate using a communication network, the processor being configured to execute instructions for:
        receiving, using the network interface, a public key;
        processing the public key to produce at least a set of addresses, wherein each address in the set of addresses identifies one or more elements in the array of addressable elements;
        generating a set of responses by reading the value of the elements in the array of addressable elements identified by the set of addresses according to a set of reading instructions;
        appending the responses in the set of responses to generate a private key;
        receiving, using the network interface, an encrypted message, and;
        decrypting the encrypted message using the private key to generate an unencrypted message.

2. The computing device of claim 1, wherein each addressable element is an element in a cryptographic table having a trinary value.

3. The computing device of claim 1, wherein processing the public key to produce at least a set of addresses includes:
    combining the public key with an additional identifying information to generate a first input;
    executing a hash function on the first input to generate a hash digest; and
    subdividing the hash digest into at least first a set of addresses.

4. The computing device of claim 1, wherein generating a set of responses further includes a preliminary step comprising:
    generating a preliminary set of responses by interrogating the elements in the array of addressable elements identified by the set of addresses;
    referencing the preliminary set of responses to a table of modified reading instructions; and
    incorporating the modified reading instructions into the set of reading instructions.

5. The computing device of claim 4, wherein each addressable element is an element in a cryptographic table having a trinary value.

6. The computing device of claim 5, wherein each trinary element of the cryptographic table holds a value analogous to "0", "1", or X", wherein an element holding a value analogous to "X" denotes that the response from the element holding the value analogous to "X" is to be removed from the set of responses by the set of reading instructions.

* * * * *

UNITED STATES PATENT AND TRADEMARK OFFICE
CERTIFICATE OF CORRECTION

PATENT NO. : 11,552,787 B2
APPLICATION NO. : 17/579426
DATED : January 10, 2023
INVENTOR(S) : Bertrand F. Cambou et al.

It is certified that error appears in the above-identified patent and that said Letters Patent is hereby corrected as shown below:

In the Specification

Column 1, Line 42, "(PM)" should be --(PKI)--.

Column 3, Line 23, "PM" should be --PKI--.

Column 3, Line 53, "PM" should be --PKI--.

Column 3, Line 54, "PM" should be --PKI--.

Column 4, Line 4, "PM" should be --PKI--.

Column 4, Line 21, "PM" should be --PKI--.

Column 4, Line 67, "$Pr_{i,j1}i=$" should be --$Pr_{i,j1}=$--.

Column 7, Line 3, "$A_{i,j}=$the" should be --$A_{i,j}=\{X_i, Y_j\}$ the--.

Column 9, Line 11, "306 (including" should be --306 $I_{i,j1}$ (including--.

Column 13, Line 43, "(PM)" should be --(PKI)--.

In the Claims

Claim 3, Column 16, Line 14, "at least first a set" should be --at least a set--.

Signed and Sealed this
Thirteenth Day of January, 2026

John A. Squires
*Director of the United States Patent and Trademark Office*